(12) United States Patent
Balachandran (10) Patent No.: US 6,577,621 B1
(45) Date of Patent: Jun. 10, 2003

(54) SYSTEM AND METHOD FOR PROVIDING HIGH-SPEED LOCAL TELECOMMUNICATIONS ACCESS

(75) Inventor: Shridharan Balachandran, El Paso, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/338,480

(22) Filed: Jun. 22, 1999

(51) Int. Cl.$^7$ ............................................. H04L 12/66
(52) U.S. Cl. ...................... 370/352; 370/356; 370/468; 370/395.51; 370/442
(58) Field of Search .................. 370/352, 356, 370/395.51, 395.52, 395.65, 428, 474, 908, 912, 420, 468, 905, 913, 902, 442

(56) References Cited

U.S. PATENT DOCUMENTS

| | | | | |
|---|---|---|---|---|
| 5,724,659 A | * | 3/1998 | Daniel et al. | 370/352 |
| 6,064,653 A | * | 5/2000 | Farris | 370/237 |
| 6,065,061 A | * | 5/2000 | Blahut et al. | 709/203 |
| 6,181,690 B1 | * | 1/2001 | Civanlar | 370/352 |
| 6,295,457 B1 | * | 9/2001 | Narayanaswamy | 370/230 |
| 6,301,229 B1 | * | 10/2001 | Araujo et al. | 370/252 |
| 6,307,853 B1 | * | 10/2001 | Storch et al. | 370/354 |
| 6,335,929 B1 | * | 1/2002 | Haster | 370/412 |
| 6,385,693 B1 | * | 5/2002 | Gerszberg et al. | 711/118 |
| 6,400,723 B1 | * | 6/2002 | Burg et al. | 370/412 |
| 6,404,773 B1 | * | 6/2002 | Williams et al. | 340/310.01 |

OTHER PUBLICATIONS

"ATM Forum to ease OOS", www.infoworld.com, Nov. 30, 1998.

* cited by examiner

*Primary Examiner*—Dang Ton
*Assistant Examiner*—Thong N. Vu
(74) *Attorney, Agent, or Firm*—Jenkens & Gilchrist, P.C.

(57) ABSTRACT

A system and method for enhancing the average local access speed of a telecommunications system is described. The technique involves the centralized reallocation of the transmission bandwidth of local access lines that are not being used by one or more subscribers in a geographically compact area. On the downlink side, voice, video and/or data traffic for all subscribers in a compact area is sent multiplexed from a local exchange to a set of geographically proximate subscribers optionally via a residential access unit serving the group of subscribers. Delay sensitive traffic is routed directly to the designated subscriber. Delay insensitive traffic for a subscriber travels over one or more segments of the local loop that is currently not in use by associated subscribers.

40 Claims, 5 Drawing Sheets

SYSTEM AND METHOD FOR PROVIDING HIGH-SPEED LOCAL TELECOMMUNICATIONS ACCESS

DESCRIPTION

1. Technical Field of the Invention

The invention relates to telecommunications access techniques, and more particularly, to a system and method for enhancing the access speed and the resource utilization in the local segment of a telecommunications system.

2. Description of Related Art

In most developed countries, wireline telecommunications services are reaching the maturity phase of their lifecycle after over a hundred years of growth. Consequently the revenue growth of wireline service providers is reaching a plateau. Wireline service providers have been eagerly searching for techniques to enhance their revenues. From a marketing viewpoint, wireline providers have available at least three distinct approaches for enhancing their revenues.

The first approach would be to expand the services offered by a wireline provider to new markets and consequently increasing its customer base. This approach works best where a product has a relatively low market penetration. Since the wireline business has reached maturity in the developed world, this approach is not likely to be very successful. The second approach would be to promote an increase in the frequency of use of the wireline service. Since the use of wireline voice services appears to be in a slow-growth phase, this approach too appears to be less than robustly lucrative.

The third approach would be to expand the chargeable use of the wireline access product, e.g., by suggesting various new ways of using the existing product. Most wireline service providers have invested large sums of money (often exceeding several millions of dollars) in setting up their infrastructure. In addition to their capital investments, they typically spend substantial sums (often several millions of dollars each year) in maintaining the copper "twisted-pair" or coaxial cable access lines to their customers. It therefore appears to have a system and method enhancing revenues that adopt this third approach.

Given the current explosion of demand for accessing the Internet, wireline access providers are facing competition in providing Internet access. More and more companies are trying to reach the pool of potential customers through alternative means for providing local access, e.g., by providing wireless access, microwave access, power line access, cable line access, etc. Many of these alternative local access techniques appear to be capable of providing relatively high-speed local access.

A wireline service provider thus needs to be in a strong position to compete with the bandwidth promised by these alternate local access technologies. The current generation of access technologies, e.g., Digital Subscriber Loop (xDSL) and Common Access Protocol (CAP) promise bandwidths of up to 8 Mbps or more. Although these are a significant advances over prior techniques, they still do not capitalize on one of the key realities about the system utilization of a current telephony network: that an average telephone line is in use for only around 8% of the time. Thus, statistically, every telephone line and associated local loop resources are idle for around 21 hours each day. Restated, this means that on average, 92% of local loop transport resources are idle at any given time.

Such unused bandwidth is a perishable resource. Failure to reuse such resources results in a direct loss of potential revenue to the wireline access provider. As a practical matter, the fixed costs of providing wireline access are relatively high while the variable costs associated with reusing the unused bandwidth for providing added bandwidth for another customer are relatively low. Thus the wireline service business is characterized by high fixed costs ("sunk costs") and low variable costs ("marginal costs"). It has even been argued that the wireline system is intrinsically a zero marginal cost business. Thus, the profitability of this business is strongly correlated with the system utilization.

In plotting the revenue against costs as a function of system utilization, it can be seen that after reaching the break-even point, all additional revenues contribute directly to the profit of the wireline service provider. Thus, any techniques for increasing the revenue while simultaneously maximizing their available bandwidth utilization is likely to receive quick acceptance from wireline service providers.

Consequently, it is desirable to have a system and method for maximizing the revenue of a wireline service provider while maximizing the use of all available bandwidth over the local loop. It has additionally been desired that the revenue enhancement technique be both simple as well as efficient in its use of network resources. Furthermore, it would be useful for new techniques to work harmoniously with the architecture of traditional Public Switched Telephony Networks (PSTNs) and data networks (e.g., the Internet).

SUMMARY OF THE INVENTION

Therefore, it is a primary object of the present invention to provide a system and method for increasing the resource utilization of a telecommunications network in order to permit an increase in access speed without a concomitant increase in resource requirements. It is an additional object of the present invention to improve the operational efficiency of the local loop by digitizing the transmission of voice, video and data signals in the local loop.

The high-speed access technique of the present invention is best understood by considering a simple and common scenario where a LEC (Local Exchange Carrier) Point of Presence (POP) or End Office (EO) services an exemplary medium-sized apartment complex with 100 homes. One end of each of the telephone lines terminates in one of the 100 homes. The other end of each of the telephone lines is connected to the LEC End Office, either directly or through a concentrator (e.g., a Remote Subscriber Stage). When a conventional telephone line is used, it is typically dedicated to the carriage of either voice or data traffic (or both in the case of a phone doubler).

Based on the empirical usage statistics noted above, out of every 100 homes having telephone access, on average, approximately eight to ten homes would be using their telephone line to communicate at any given moment in time, while the remaining 90 or so telephone lines would be idle. A user accessing a data network, such as the Internet, through a modem using the K56flex, x2 or the V.90 protocol would ordinarily be getting a data throughput of around 40–50 Kbps. A xDSL customer can expect a typical download bandwidth of about 6 Mpbs. The system and method of the present invention transforms the exemplary wireline network in such a way that the unutilized or underutilized 90 or so telephone lines are used to carry traffic for one or more of the active users. This can permit the apparent bandwidth to, for example, a single user to be theoretically increased by a factor of approximately 90. If the unused local loop bandwidth is shared evenly by the 8–10 active users, each of these users can obtain a bandwidth improvement of approximately ten-fold.

The system and method of the present invention thus treats the telephone lines to a community as a shared resource, taps the unused bandwidth and harnesses it for Unspecified Bit Rate (UBR) or Available Bit Rate (ABR) traffic as defined by the Asynchronous Transfer Mode (ATM) specifications. The system includes a plurality of home user sites organized in a cluster and connected together in a network, such as a local area network. The system further includes a traffic concentrator having a physical connection to each user site, for receiving communications from a Public Switched Telephony Network (PSTN) and from a data network, such as the Internet. In the system, each PSTN communication and data network/Internet communication identifies a destination user site for receiving the communication. The traffic concentrator transmits the received communication which is deemed delay sensitive and/or is destined to a user site subject to a relatively favorable service level agreement with the telecommunication service provider to the corresponding destination user site over the physical connection corresponding thereto, and transmits the received communication which is delay insensitive and/or destined to a user subject to a relatively less favorable service level agreement to a user site corresponding to an unused physical connection. Each user site includes a traffic deconcentrator for determining if the communication received at the user site is the same as the specific user site to which the communication is destined, and transmitting the communication over the local area network to a distributor upon an affirmative determination that the user site does not match the specific user site to which the communication is destined. The distributor receives the communication from the user site corresponding to the unused physical connection and redirects the communication to the appropriate destination user site.

By transmitting the delay insensitive communication and/or communication destined for a user site which is subject to a less favorable service level agreement between the traffic concentrator and the user sites over unused physical connections, system resource utilization and effective transmission bandwidth are advantageously increased, which thereby increases system resource utilization and system access speed.

BRIEF DESCRIPTION OF THE DRAWINGS

A more complete understanding of the method and system of the present invention may be obtained by reference to the detailed description of the preferred embodiment that follows, taken in conjunction with the accompanying drawings, wherein.

DESCRIPTION OF THE PREFERRED EMBODIMENT

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
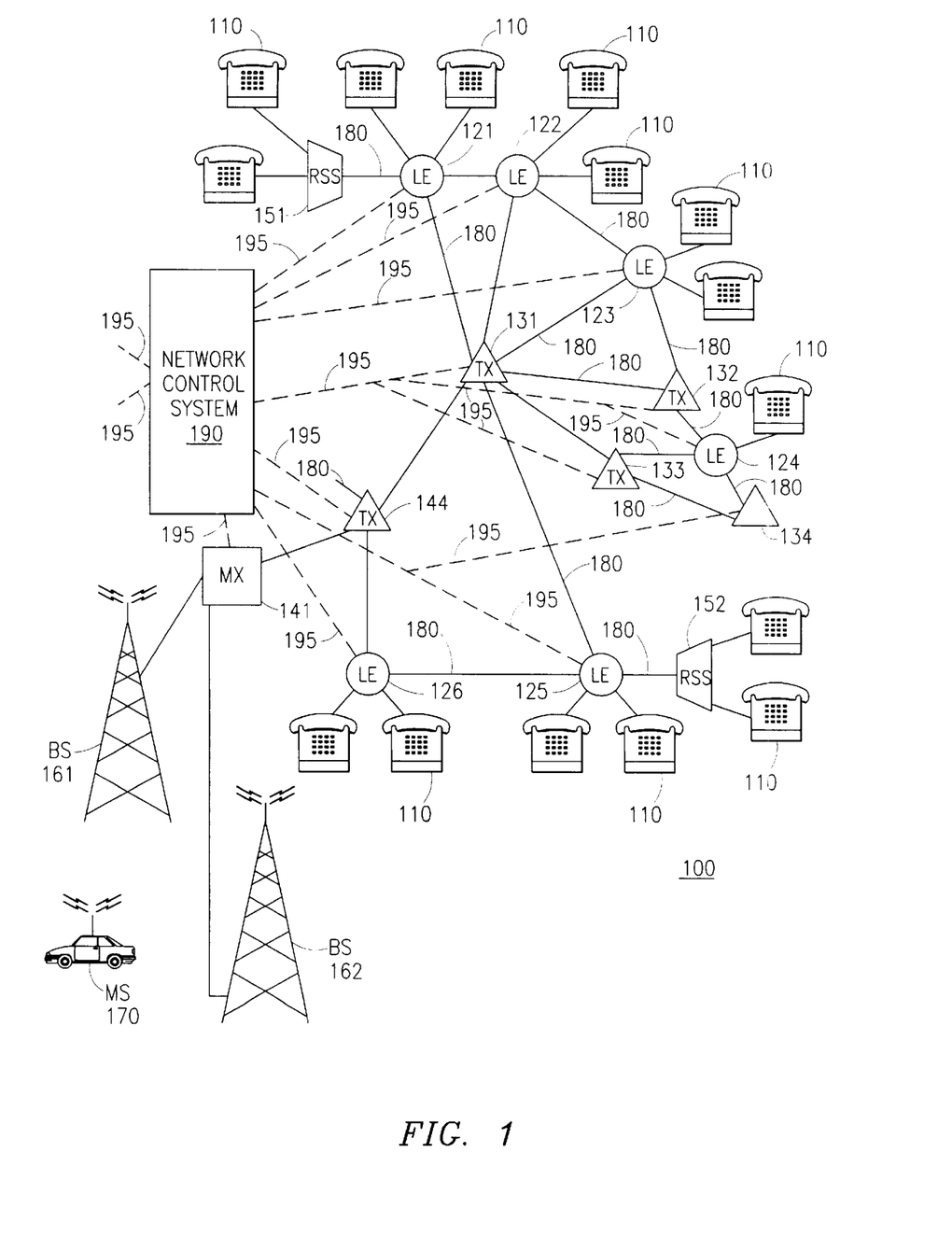
FIG. 1 is a an illustrative schematic diagram of a conventional public telecommunications network.

Referring first to FIG. 1, there is shown an illustrative schematic diagram of a conventional public telecommunications network 100 including a plurality of Local Exchanges (LEs) 121–126, each of which has a plurality of local subscribers connected thereto and represented by telephone instruments 110. Two of the local exchanges 121 & 125 are represented as having Remote Subscriber Multiplex Stages (RSSs) 151 & 152 associated therewith which, in turn, have local customers 110 connected thereto. The network of FIG. 1 also includes a plurality of Trunking Exchanges (TXs) 131–134 which serve primarily to interconnect various local exchanges with one another and to provide routes between various parts of the network. Trunk Exchange 144 is shown connected to a Mobile Exchange 141 which in turn is linked to a pair of illustrative Base Stations (BSs) 161 & 162 serving a plurality of mobile radio telephone subscribers (MSs) represented as 170.

In addition, other telecommunications services such as databases and intelligent networks may also be connected to various ones of the exchanges shown. Between each of the exchanges 121–126, 131–134 & 141 in the network, there are shown a plurality of communication paths 180, each of which may, in turn, comprise a plurality of communication circuits, including cables, optical links or radio links for carrying voice and/or data communication between the various exchanges within the network.

The network of FIG. 1 also includes a network control system 190 which is connected to each of the exchanges 121–126, 131–134 & 141 within the network 100 by means of communication links 195 (represented by dotted lines) for the transmission of control signals to each exchange and for the reception of traffic data from each exchange. The network control system 190 issues commands to dynamically reconfigure the communication paths within the various traffic routes of the network as well as to control the alarm systems within the exchanges of the network in order to fine tune the performance of the network 100.

Prior to a detailed consideration of the system and method of the present invention, it would be useful to review the infrastructure of the local loop. As noted earlier, the system and method of the present invention is best understood by considering a LEC Point of Presence or End Office that services an exemplary medium-sized apartment complex with 100 homes. One end of each of the 100 telephone lines terminates in one of the 100 homes. The other end of each of the telephone lines is connected to the LEC End Office, either directly or through a concentrator (e.g., a Remote Subscriber Stage). As noted earlier, a conventional telephone line is typically dedicated to the carriage of either voice or data traffic (or both in the case of a phone doubler).

Figure 2:
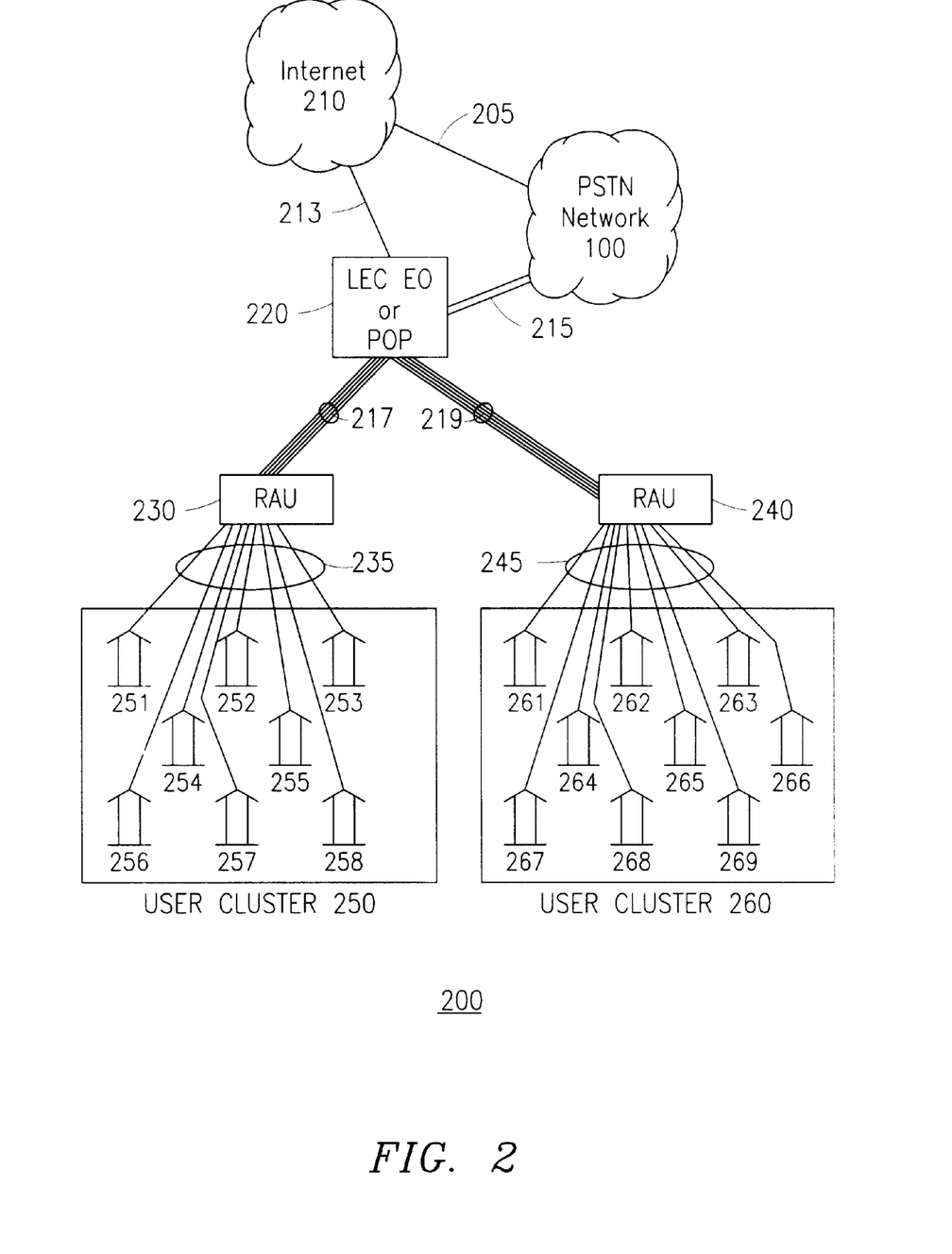
FIG. 2 is a schematic diagram of an exemplary final segment of the local loop of a conventional local exchange.

FIG. 2 is a schematic diagram of an exemplary final segment of the local loop of a conventional local exchange. As shown in FIG. 2, a conventional Public Switched Telephony Network (PSTN) 100 services one or more exemplary user clusters 250 & 260 via a local exchange carrier end-office (EO) (or an Internet service provider's Point of Presence (POP)) 220. The PSTN 100 is linked to the EO/POP 220 via a high-speed digital connection 215 (e.g., a T1 link). The EO/POP 220 may also be directly connected to the Internet 210 via a high-speed link 213. The PSTN 100 is typically connected to the Internet 210 at multiple points such as the exemplary connection 205 shown in FIG. 2.

The EO/POP 220 serves user clusters 250 & 260 via Residential Access Units (RAUs) 230 & 240 respectively. The EO/POP 220 is connected to RAUs 230 & 240 by high-capacity analog or digital links 217 & 219 respectively. The links 217 & 219 may in certain instances be multiplexed communications links. The RAU 230 services users 251–258 of user cluster 250 via individual twisted-pair telephone lines 235. Likewise, the RAU 240 services users 261–269 of user cluster 260 via individual twisted-pair telephone lines 245.

As noted earlier, out of every 100 homes having telephone access, at any given moment on time, on average approximately eight to ten homes use their telephone line to communicate, while the remaining 90 or so telephone lines are idle. A user accessing a data network, such as the Internet, through a modem using the K56flex, x2 or the V.90 protocol would ordinarily be getting a data throughout of around 40–45 Kbps. A xDSL customer can expect a typical download bandwidth of about 6 Mbps.

The system and method of the present invention transforms the exemplary wireline network in such a way that the unutilized or underutilized 90 or so telephone lines associated with the group of 100 homes are used to carry traffic for one or more of the active users. This can permit the apparent bandwidth to a single user to be theoretically increased by a factor of about 90 or so (i.e., to about 3.6–4 Mbps using K56flex, or 540 Mbps for xDSL). If the unused local loop bandwidth is shared evenly by the 8–10 active users, each of these users can obtain a bandwidth improvement of approximately 10-fold (i.e., about 400–450 Kbps for K56flex and 50 Mbps for xDSL). The system and method of the present invention treats the telephone lines to a community as a shared resource, taps the unused bandwidth and harnesses it for Unspecified Bit Rate (UBR) or Available Bit Rate (ABR) traffic in accordance with the Asynchronous Transfer Mode (ATM) Quality of Service (QoS) specifications.

Figure 3:
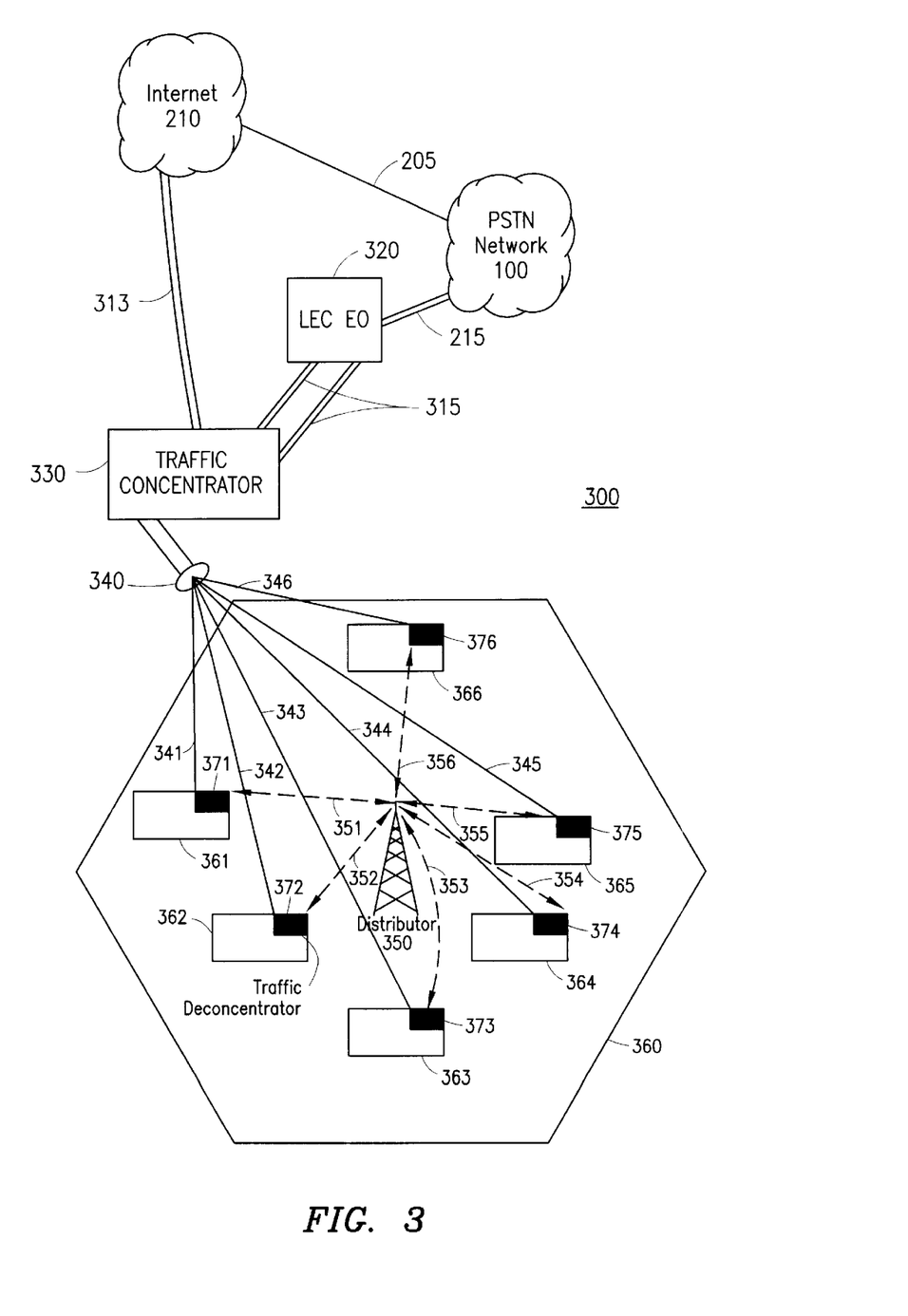
FIG. 3 is a schematic diagram showing the enhanced local loop of a local exchange carrier within which the system and the method of the present invention may be employed.

FIG. 3 is a schematic diagram showing the enhanced local loop of a local exchange carrier within which the system and method of the present invention may be employed. As shown in FIG. 3, a PSTN 100 serves home or user sites 361–366 of user cluster 360 via an EO 320. As with the architecture of the conventional local loop shown in FIG. 2, the enhanced local loop architecture of FIG. 3 too has the EO 320 connected to the PSTN 100 via a high-speed digital link 215. Again as before, the PSTN 100 is multiply connected to a data network 210, such as the Internet, as illustrated by the exemplary link 205 shown in FIG. 3. Data network 210 is illustrated in FIG. 3 as the Internet 210 for exemplary purposes only. It is understood that data network 210 may be virtually any data network for primarily communicating data traffic.

In the enhanced local loop architecture of FIG. 3, the EO 320 serves the user cluster 360 via a traffic concentrator and/or discriminator and/or distributor 330 (hereinafter "traffic concentrator"). The traffic concentrator 330 may be connected to the EO 320 via a high-speed link 315 or located in EO 320. The traffic contractor 330 may also be optionally connected to the Internet 210 via another high-speed link 313.

In exemplary illustration of the enhanced local loop architecture of the present invention that is illustrated in FIG. 3 in which user sites 361–366 correspond to home user sites, the traffic concentrator 330 serves homes 361–366 of user cluster 360 via a multi-line telephone cable 340 that separates into individual twisted-pair telephone lines 341–346 associated with each of the homes 361–366. Each of the telephone lines 341–346 terminates in traffic deconcentrators 371–376 that are associated with each of the homes 361–366, respectively. A distributor 350 that is located within or near user cluster 360 serves to redistribute traffic intended for one or more of the homes 361–366 that is received at a traffic deconcentrator associated with another one of the homes 361–366, as explained in greater detail below.

It is understood that user sites 361–366 may alternatively correspond to business user sites. In this scenario, each business site 361–366 may be connected to traffic concentrator 330 via a coaxial cable 341–346 or other communications line.

In the system and method of the present invention, the telephone lines 341–346 are logically and physically grouped into a "pipe" 340. As noted earlier, the traffic concentrator 330 receives traffic from the EO 320 and the Internet 210. The traffic concentrator 330 may selectively perform a D-to-A conversion of the data received from EO 320 and packetize the data into Internet Protocol (IP) or ATM-based packet format. For instance, digital conversion may be performed on signals appearing on the secondary voice channels while the voice signals on the primary voice channel are not be packetized.

Each data packet is assigned a unique address, such as an IP or ATM based address, that is associated with the destination home telephone number. In an alternative embodiment of the present invention, each possible destination (even inside a single home) is associated with a unique address. The use of such unique addresses is likely to be particularly useful with the emerging telecommunications system of the future that are likely to be entirely digital. Such digital telecommunications systems are expected to be capable of delivering Asynchronous Transfer Mode (ATM) streams (voice, video or data) directly to desktop systems.

In contrast to the traffic from the EO 320, the IP packets from the Internet 210 will already be in packetized format when they are received at the traffic concentrator 330. The IP packets inherently include the destination IP address.

In the preferred embodiment of the present invention, the traffic concentrator 330 gives higher delivery priority to certain traffic. This is done by placing the higher priority traffic on the appropriate one of the telephone lines 341–346. Lower priority traffic, including but not necessarily limited to the IP packets from the Internet 210, can be placed on any of the remaining bandwidth of the "pipe" 340. The IP packets are then modulated using PPP or ATM over xDSL/CAP techniques and transmitted directly to the homes 361–366 of the user cluster 360.

In determining whether traffic is to be sent directly to the appropriate home 361–366 to which the traffic is destined or sent indirectly through a home 361–366 having an unused telephone line 341–346, traffic concentrator 330 may take into consideration the particular service level agreements existing between homes 361–366 and the communications provider. In this way, a higher priority may be provided not only to delay sensitive traffic but also to traffic destined to each home 361–366 whose communication is subject to more favorable service level agreements.

The system and method of the present invention may no longer need a Residential Access Unit (e.g., RAU 230 or RAU 240) for each user cluster 360, although the presence of such RAUs does not necessarily hinder the operation of the subject invention. The packets received at the homes 361–366 terminate in so-called traffic deconcentrators or demultiplexors 371–376. Each of the homes 361–366 is associated with one of the traffic deconcentrators 371–376, respectively.

In one embodiment of the present invention, the packets destined for a select one of the homes 361–366 are fed to the appropriate one of the telephone lines 341–346. The packets may be transported directly as a digital signal or converted to an analog signal prior thereto. The packets, including IP packets from Internet 210, that are destined for a specific one of the homes 361–366 can be distinguished from packets intended for another one of the homes (preferably by examining the unique destination address associated with the packet but possibly also based on any other address discrimination technique) via a separate interface directly to the networked device.

In the preferred embodiment of the present invention, packetized data received at a home 361–366 that is not destined for that home is initially encrypted for security reasons and retransmitted via a specified air interface (e.g., as a wideband wireless data packet). This encrypted, packetized data is preferably centrally collected at a distributor 350 (FIG. 3) and redistributed thereby. In one embodiment of the present invention, the distributor 350 has a storage mechanism to buffer the received data. The distributor 350 determines the intended destination of the packetized data received from any of traffic deconcentrators 371–376 and redistributes the packetized data via a wireless or wireline local area network to the intended one of the destination homes 361–366.

It should be noted that the unlicensed spectrum can be used if the distance or the power of transmission is within permitted limits for transmissions of this type.

As stated above, home user sites 361–366 may be connected together in a local area network. Alternatively, home user sites 361–366 and distributor 350 may form at least a portion of a cell in a Local Multipoint Distribution System (LMDS) or Multichannel Multipoint Distribution System (MMDS). In this case, data is communicated wirelessly as high frequency microwave signals between distributor/hub 350 and home sites 361–366 within cell 360.

In addition, four wires are conventionally routed to each home user site 361–366, only two of which are typically used for carrying voice traffic. It is understood that the unused wires may be used as part of the local area network infrastructure. In the event an RSS and/or RAU is present in the system, the RSS/RAU may then be utilized as the head end of the local area network.

Further, the network in which user sites 361–366 are connected may comprise an Asynchronous Transfer Mode (ATM) network in which the present system service is IP over ATM or IP over ATM over xDSL. In this case, ATM cells are utilized at distributor 350 and/or at the traffic deconcentrators 371–375.

In accordance with the present invention, traffic deconcentrators 371–376 and distributor 350 are capable of efficiently utilizing system resources for communications originating from user sites 361–366 towards Internet 210 or PSTN 100. Specifically, each traffic deconcentrator 371–376 receives user-generated traffic from the user site 361–366 associated therewith. Each traffic deconcentrator 371–376 is also capable of identifying delay sensitive traffic in the traffic which traffic deconcentrator 371–376 receives, identifying whether the respective home user site 361–366 is subject to a relatively more favorable service level agreement, and determining higher priority traffic based thereupon. Further, each traffic deconcentrator 371–376 transports the determined higher priority traffic directly to traffic concentrator 330 over corresponding communication line 341–346 for subsequent transport to EO 320 or Internet 210. Traffic deconcentrator 371–376 also transports at least some of the received traffic which is identified as delay insensitive traffic and/or traffic originating from homes 361–366 which are subject to less favorable service level agreements to distributor 350. Distributor 350 responsively transports the received traffic to a traffic deconcentrator 371–376 associated with an unused telephone lines 341–346. Upon receiving traffic directly from its respective home user site 361–366 or from distributor 350, each traffic deconcentrator 371–376 preferably transports the traffic to is traffic concentrator 330, which thereupon transports the traffic to the appropriate one of EO 320 or Internet 210. As a result, system resources are better utilized for both uplink, and downlink communication.

Figure 4:
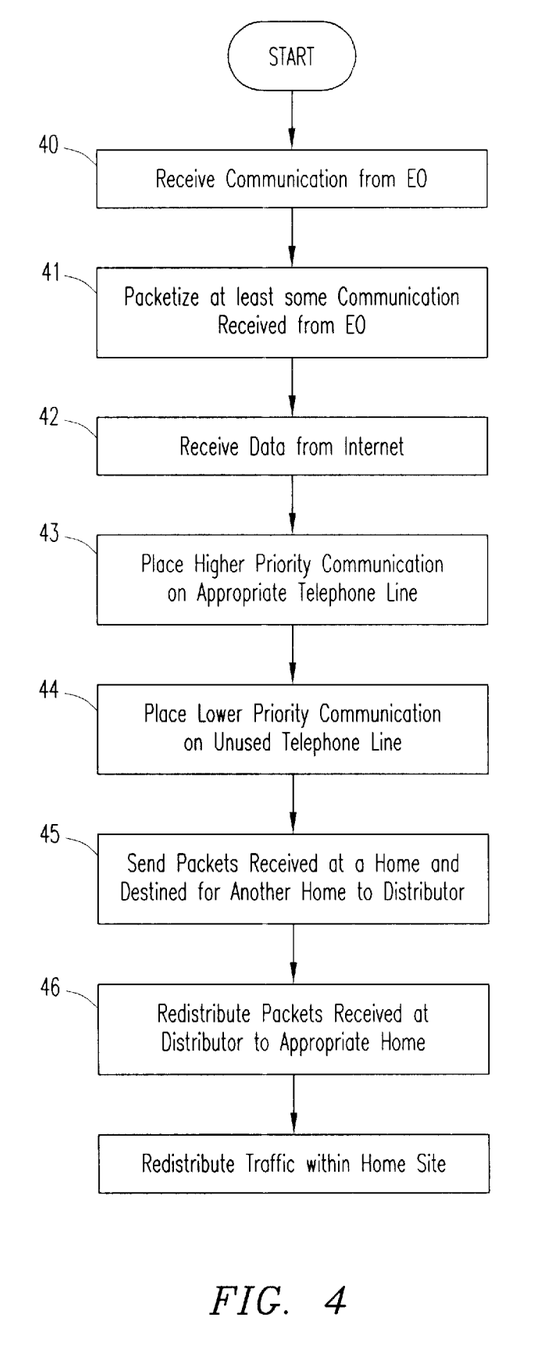
FIG. 4 is a flow chart illustrating an operation of the present invention shown in FIG. 3.

The operation of the present invention will be described with reference to FIG. 4. Initially, information received by traffic concentrator 330 at step 40 from EO 220, such as delay insensitive information and/or information destined for homes 361–366 which communicate subject to less favorable service level agreements, may be packetized at step 41, having a unique address, such as an IP address, which is associated with the destination home 361–366. In addition, IP data packets are received by traffic concentrator 330 from Internet 210 at step 42. Because received IP data packets are already packetized and include a destination IP address, the received IP data packets are not further packetized or otherwise conditioned.

As stated above, traffic concentrator 330 gives the transmission of delay sensitive traffic received from EO 320 and traffic destined for home sites 361–366 which are subject to more favorable service level agreements a higher priority relative to the transmission of other traffic, such as data packets received from Internet 210. Accordingly, traffic concentrator 330 places the higher priority traffic from EO 320 on the appropriate telephone line 341–346 at step 43. Traffic concentrator 330 then places the other traffic, such as the delay insensitive traffic from EO 320, the IP packetized data received from Internet 210 during step 42 and traffic destined for homes 361–366 subject to less favorable service level agreements on any remaining unused telephone line 341–346 at step 44.

In the event packetized data is sent to a home 361–366 which is not the intended destination home, the traffic deconcentrator 371–376 of the home 361–366 which received the packetized data retransmits it at step 45 over an air interface to distributor 350. Distributor 350 receives the packetized data, determines its intended destination address and/or home 361–366, and redistributes the packetized data thereto at step 46. In this way, the present system utilizes unused bandwidth to communicate information between PSTN 100, Internet 210 and homes 361–366 so as to increase bandwidth and thus increase system resource utilization.

Figure 5:
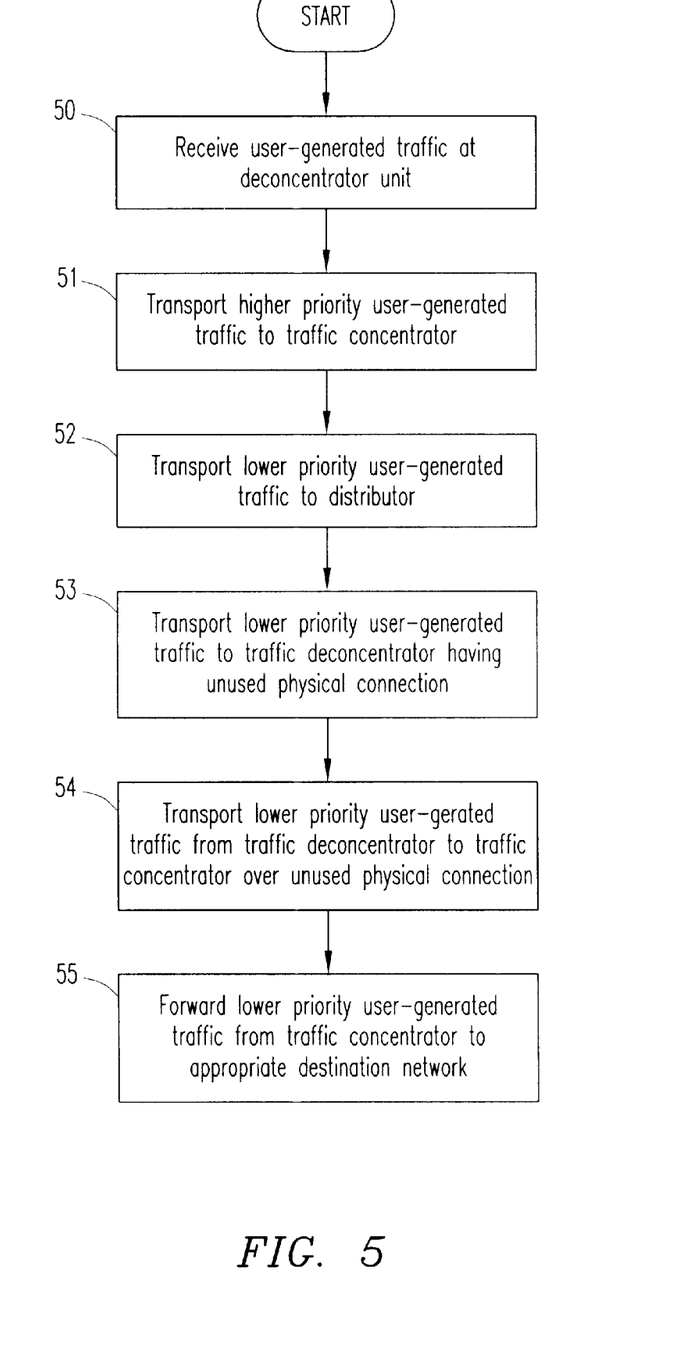
FIG. 5 is a flow chart illustrating another operation of the present invention shown in FIG. 3.

On the uplink side, a voice, video and/or data signal is sent directly from a home telephone or computer in one of the homes 361–366 to the traffic deconcentrator unit 371–376 associated therewith at step 50 (FIG. 5). In the event the signal is deemed a signal having higher priority data, the traffic deconcentrator 371–376 may selectively sample and convert the signal prior to transporting the signal to traffic concentrator 330 at step 51, for subsequent transport to the appropriate network destination. In one embodiment of the present invention, the data stream or other lower priority traffic from one or more of the traffic deconcentrators 371–376 is forwarded to the distributor 350 at step 52. Upon receiving the lower priority traffic, distributor 350 transports at step 53 the lower priority traffic to a traffic deconcentrator 371–376 associated with an unused communications line 341–346. Next, at step 54 traffic deconcentrator 371–376 receives the lower priority data from distributor 350 and transports it to traffic concentrator 330 over the unused communications line 341–346. When received by traffic deconcentrator 330, the lower priority traffic is discriminated and forwarded at step 55 to the EQ 320 or the Internet 210 (as appropriate).

It should be noted that the gains permitted by the technique of the present invention are not entirely cost-free, e.g., there is the need for specialized equipment, the need for additional spectrum, etc. The costs, however, are clearly limited. The additional spectrum used for the localized rerouting of data streams using the distributor 350 requires the payment of no licensing fees. Furthermore, the bandwidth gains offered by the system and method of the present invention derive principally from the basic statistical nature of the telephone usage. The overlay of additional infrastructure is relatively minimal. The system and method of the present invention is scalably usable with both small as well as large local area networks (LANs).

The system and method of the present invention can be further extended to provide additional features and services. In one such extension of the present invention, the present invention performs "web caching" wherein the distributor 350 additionally comprises a database that can proactively retrieve and store web pages associated with frequently accessed Internet sites at times when the bandwidth utilization is relatively low. This reduces the load time of users for accessing at least some of their favorite web pages. In an alternative extension of the system and method of the present invention, a group of homes is linked together via a wireless interface. This permits the "pipe" 340 to be substituted by a wireless distributed solution. In yet another extension of the present invention, electrical power lines and/or plumbing lines are used in lieu of the distributor 350 to provide the local area network connection.

It should be emphasized that the system and method of the present invention is readily adapted for immediate implementation in any wireline community, such as in the United States, Europe or elsewhere in the world since the marginal cost of implementing the system easily outweighs the revenue gains from line utilization. The system and method of the present invention maximizes the use of the existing infrastructure while yielding additional revenue at the same time.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method for increasing an effective transmission bandwidth between a Public Switched Telephony Network (PSTN), a data network and a plurality of user sites organized in a cluster and connected together in a network, the method comprising the steps of:

receiving traffic from the PSTN destined for first specific ones of the user sites;

receiving traffic from the data network destined for second specific ones of the user sites;

identifying delay sensitive traffic from the traffic received during the step of receiving traffic from the PSTN;

forwarding the identified delay sensitive traffic from the PSTN to a corresponding one of the first specific user sites over a physical communications link connecting to the corresponding first specific user site;

forwarding at least some of the traffic from the data network to an unused physical communications link connecting to a select one of the user sites in the cluster; and redistributing the data network traffic received at the select user site having the unused physical communications link to an appropriate one of the second specific user sites to which the traffic from the data network was destined.

2. The method of claim 1, wherein:

each user site is associated with a unique address.

3. The method of claim 2, wherein:

the unique address associated with each of the user sites is an address based upon a number for the user site.

4. The method of claim 1, further comprising the steps of:

forwarding traffic received during the step of receiving traffic from the PSTN other than the identified delay sensitive traffic to an additional unused physical communications link connecting to an additional select one of the user sites in the cluster; and redistributing the traffic other than the delay sensitive traffic to an appropriate one of the first specific user sites to which the traffic was destined.

5. The method of claim 1, wherein the step of redistributing comprises the steps of:

transmitting the data network traffic received at the user site having the unused physical communications link over the network to a distributor; and transmitting the data network traffic received by the distributor to the appropriate user site to which the data network traffic is destined.

6. The method of claim 5, further comprising the step of:

temporarily storing the data network traffic received by the distributor prior to the step of transmitting the data network traffic to the appropriate user site.

7. The method of claim 1, further comprising the steps of:

monitoring Internet sites accessed by the user sites in the cluster; and retrieving and storing frequently accessed Internet sites for future transmission to user sites accessing the frequently accessed Internet sites.

8. The method of claim 1, wherein:

said network connecting the user sites in the cluster comprises a store-and-forward system.

9. The method of claim 1, wherein:

the network connecting the user sites in the cluster comprises electrical power lines linking the user sites together.

10. The method of claim 1, wherein:

the network connecting the user sites in the cluster comprises plumbing lines linking the user sites in the cluster.

11. The method of claim 1, further comprising the step of:

selectively packetizing the traffic from the PSTN prior to the step of forwarding traffic from the PSTN.

12. The method of claim 11, wherein:
the packetized traffic from the PSTN includes destination information of the specific user site to which the traffic from the PSTN is to be sent.

13. The method of claim 1, further including the step of:
encrypting the traffic from the data network prior to the step of redistributing the data network traffic.

14. The method of claim 1, wherein:
the data network comprises the Internet.

15. The method of claim 1, wherein:
the network connecting the user sites in the cluster comprises a wireless network.

16. A system for communicating between a Public Switched Telephony Network (PSTN), a data network and a plurality of user sites organized in a cluster and communicatable with each other, comprising:
a traffic concentrator having a physical communications link to each of the user sites, for receiving traffic from the PSTN destined for a first specific ones of the user sites, receiving traffic from the data network destined for a second specific ones of the user sites, identifying delay sensitive traffic from the traffic received from the PSTN, transmitting the delay sensitive traffic from the PSTN to a corresponding one of the first specific user sites over the physical communications link connected thereto, and transmitting at least some of the remaining traffic from the PSTN and the data network over at least one unused physical communications link to a select one of the user sites associated therewith; and
redistributing means for selectively redistributing the remaining traffic received at the select user site corresponding to the unused physical communications link to appropriate ones of the first and second specific user sites to which the remaining traffic is destined.

17. The system of claim 16, wherein:
the redistributing means comprises a traffic deconcentrator at each of the user sites for determining if the user site which received the remaining traffic is the same as the appropriate user site to which the remaining traffic is destined, and if not, transmitting the remaining traffic over the network.

18. The system of claim 17, wherein the redistributing means further comprises:
a distributor element communicatable with each said traffic deconcentrator over the network, for receiving the remaining traffic sent thereover by each said traffic deconcentrator, determining the appropriate user site to which the remaining traffic is destined, and transmitting the remaining traffic thereto.

19. The system of claim 18, wherein:
the distributor element transmits the data network traffic to the appropriate user site to which the data network traffic is destined over an air interface.

20. The system of claim 18, wherein:
the distributor element includes a buffer for temporarily storing the remaining traffic.

21. The system of claim 18, wherein:
the distributor element monitors web pages which are accessed by the user sites in the cluster, retrieves web pages which are frequently accessed by the user sites in the cluster, and stores the retrieved web pages for future transmission to requesting user sites in the cluster.

22. The system of claim 18, wherein:
each traffic deconcentrator receives user-generated traffic from the user site associated therewith, determines if the user-generated traffic is higher priority traffic, and sends the user-generated traffic to the distributor element upon an affirmative determination that the user-generated traffic is not higher priority traffic.

23. The system of claim 22, wherein:
the distributor element receives the user-generated traffic sent by a first one of the traffic deconcentrators and sends the user-generated traffic to a second one of the traffic deconcentrators associated with an additional unused physical communications link, for subsequent transport to the traffic concentrator.

24. The system of claim 16, wherein:
each user site is associated with a unique address.

25. The system of claim 16, wherein:
the traffic concentrator selectively packetizes the communication received from the PSTN prior to transmission thereof.

26. The system of claim 16, wherein:
the user sites and the redistributing means form a portion of an LMDS network.

27. The system of claim 16, wherein:
the user sites and the redistributing means form a portion of an MMDS network.

28. The system of claim 16, wherein:
the data network comprises the Internet.

29. The system of claim 16, wherein:
the user sites are connected in a local area network, wherein unused physical communications links connected to the user sites form a portion of the connectivity of the local area network.

30. The system of claim 29, further including:
a Remote Subscriber Stage (RSS) connected between the traffic concentrator and the user sites, wherein the unused physical communications links are connected between the RSS and the user sites, with the RSS forming a head end of the local area network.

31. A communications system, comprising:
a plurality of user sites organized in a cluster and connected together;
a traffic concentrator having a physical connection to each user site, for receiving communications from a Public Switched Telephony Network (PSTN) and from a data network, each PSTN communication and data network communication identifying a destination user site for receiving the communication, for transmitting the received communications that are delay sensitive to the respective destination user site over the physical connection corresponding thereto, and for transmitting at least some of the received communications which are delay insensitive to at least one user site corresponding to an unused physical connection; and
a distributor for redistributing the at least some of the delay insensitive communications from the user site corresponding to the unused physical connection to the destination user sites for the at least some of the delay insensitive communications.

32. The system of claim 31, further comprising:
a plurality of traffic deconcentrator units, each traffic deconcentrator unit being associated with a distinct user site, for determining whether a delay insensitive communication received at a respective user site is the destination user site therefor, and for transmitting the delay insensitive communication over the network to the distributor upon an affirmative determination that the respective user site which received the delay insensitive communication is not the destination user site therefor.

33. The system of claim 32, wherein:

the distributor includes a buffer for temporarily storing the data network communication sent to the distributor.

34. The system of claim 32, wherein:

the distributor monitors web pages which are accessed by the user sites in the cluster, retrieves web pages which are frequently accessed by the user sites in the cluster, and stores the retrieved web pages for future transmission to user sites requesting the frequently accessed web pages.

35. The system of claim 31, wherein:

the traffic concentrator selectively packetizes the PSTN communications prior to transmission to the corresponding destination user site therefor.

36. The system of claim 31, wherein:

the network comprises a wireless network.

37. The system of claim 31, wherein:

each user site is associated with a unique address; and each PSTN communication and data network communication includes an address corresponding to the destination user site therefor.

38. The system of claim 31, further comprising:

a plurality of traffic deconcentrator units, each traffic deconcentrator unit being associated with a distinct user site, for receiving user-generated communication from the respective user site, determining if the user-generated communication is delay sensitive communication and sending the user-generated communication to the distributor if the user-generated communication is not delay sensitive.

39. The system of claim 38, wherein:

the distributor receives the user-generated communication sent by a first one of the deconcentrator units and transports the user-generated communication to a second one of the deconcentrator units corresponding to an additional unused physical connection, for subsequent transport to the traffic concentrator.

40. The system of claim 31, wherein:

the traffic concentrator transmits the received communications to the respective destination user site based upon a service level agreement corresponding to the destination user site.

* * * * *